United States Patent [19]
Bragin et al.

[11] Patent Number: 4,635,900
[45] Date of Patent: Jan. 13, 1987

[54] GATE VALVE

[75] Inventors: Boris F. Bragin; Felix D. Markuntovich, both of Voroshilovgrad, U.S.S.R.

[73] Assignee: Voroshilovgradsky Mashinostroitelny Institut, Voroshilovgrad, U.S.S.R.

[21] Appl. No.: 733,624

[22] Filed: May 13, 1985

[30] Foreign Application Priority Data

May 17, 1984 [SU] U.S.S.R. .............. 3734951

[51] Int. Cl.[4] .............................................. F16K 3/00
[52] U.S. Cl. .................................... 251/326; 251/329
[58] Field of Search ............... 251/326, 81, 77, 327, 251/329, 128

[56] References Cited

U.S. PATENT DOCUMENTS

| | | | |
|---|---|---|---|
| 966,713 | 8/1910 | Snow | 251/326 X |
| 1,221,052 | 4/1917 | Henry, Jr. | 251/326 X |
| 1,243,736 | 10/1917 | Hibbard | 251/326 |
| 1,280,451 | 10/1918 | Hagen | 251/326 X |
| 2,676,780 | 4/1954 | Wheatley | 251/77 X |
| 4,506,865 | 3/1985 | Bragin et al. | 251/326 X |

*Primary Examiner*—Larry Jones
*Attorney, Agent, or Firm*—Ladas & Parry

[57] ABSTRACT

A gate valve used in pipeline transfer operations comprises a housing having a passage for conveying a fluid medium carrying solid particles, and a gate which is connected to a drive shaft for opening and closing the passage through an articulating joint made up of two elements. The first element of this joint is rigidly connected to the shaft and arranged with a clearance relative to the gate. The second element is rigidly connected to the gate and disposed with a clearance relative to the first element. Slots are provided in one of these elements to communicate the clearances with the passage for evacuating solids therefrom. The gate valve ensures tight closing of the passage by the gate and has a long service life.

3 Claims, 5 Drawing Figures

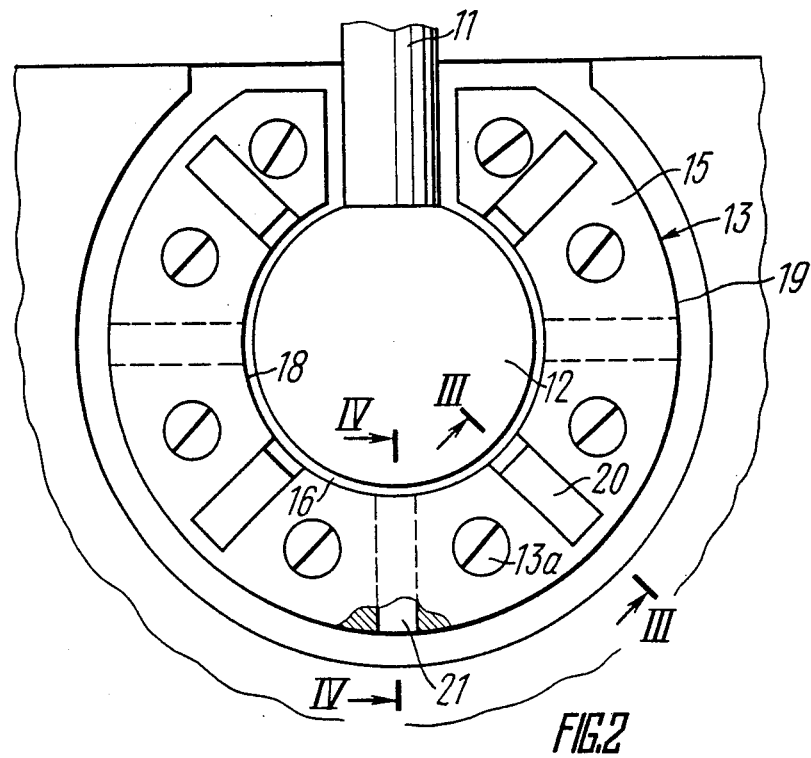
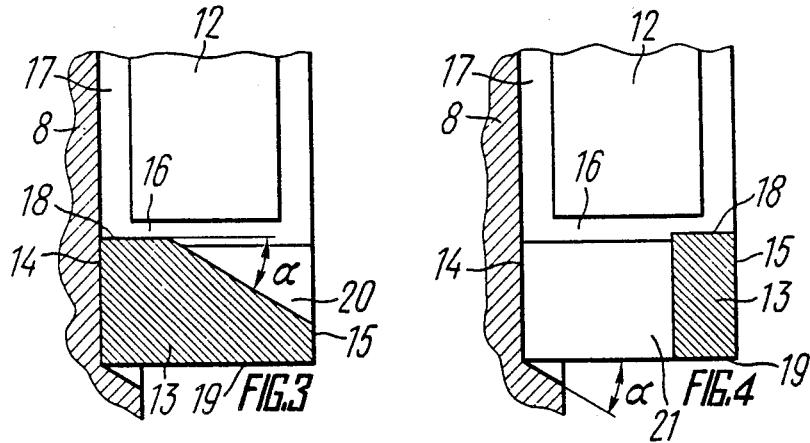

GATE VALVE

FIELD OF THE INVENTION

This invention relates to pipe fittings, and more particularly to a gate valve.

The gate valve embodying the present invention can find application in pipelines carrying suspensions of loose abrasive materials, particularly pulp-like materials.

The proposed gate valve can also be used in the mining, construction, chemical and other industries employing pneumatic and hydraulic conveying systems for transferring suspensions carrying solid particles and other fluid media accompanied by a tendency of the solids carried by such media to deposit on gate vave housings and accumulate in clearances between gate valve parts thus affecting gate closing and opening operations.

PRIOR ART

At present, wide use have found pipeline transport systems for conveying suspensions of loose materials in water or other fluids. Main pipelines are being constructed on a large scale for conveying in water minerals at long distances.

Nowdays a number of countries are making use of such systems for the transportation of coal, ore and other minerals.

Reliability of such systems depends largely on the performance of pipe fittings, including gate valves which are an essential element of hydraulic transfer systems.

This invention relates to pipe fittings, and more particularly to a gate valve.

The gate valve embodying the present invention can find application in pipelines carrying suspensions of loose abrasive materials, particularly pulp-like materials.

The proposed gate valve can also be used in the mining, construction, chemical and other industries employing pneumatic and hydraulic conveying systems for transferring suspensions carrying solid particles and other fluid media accompanied by a tendency of the solids carried by such media to deposit on gate vave housings and accumulate in clearances between gate valve parts thus affecting gate closing and opening operations.

At present, wide use have found pipeline transport systems for conveying suspensions of loose materials in water or other fluids. Main pipelines are being constructed on a large scale for conveying in water minerals at long distances.

Nowdays a number of countries are making use of such systems for the transportation of coal, ore and other minerals.

Reliability of such systems depends largely on the performance of pipe fittings, including gate valves which are an essential element of hydraulic transfer systems.

Gate valves are even more popular in the hydraulic transfer systems used in mineral resources treatment facilities. These include dressing mills of the coal, mining and related industries where concentration processes are carried out in a water medium.

Gate valves are further used extensively in hydraulic mining, civil engineering and elsewhere.

Elements of major functional importance in a gate valve are its gate and valve seat. Reliable abutment of the gate to the valve seat assures the absence of leaks in the gate valve passage and extends the service life of these elements.

In view of the foregoing, the provision of gate valves capable of reliably blocking the flow of fluid carrying solid particles is a major problem to be solved in pipeline transport systems.

There are known gate valves for blocking the flow of fluids carrying solids, for example, a gate valve taught in a publication by D. F. Gurevich "Raschet i konstruirovanie truboprovodnoi armatury" (Pipeline Fitting Design), Leningrad, the "Machinostroenie" Publishers, 1969, p. 186, FIG. 189.

This gate valve has a housing with a passage for conveying a fluid medium closable by a gate connected to a drive shaft acting to reciprocate the gate for opening and closing of the gate valve passage.

The end of the drive shaft inside the gate valve housing has a T-shaped configuration to be embraced with clearances by the walls of a T-shaped gate slot. The T-shaped shaft end and the T-shaped gate slot make up an articulating joint during their cooperation.

Thanks to the clearances, the gate can move transversely of the shaft to tightly fit the seat disposed on the inner wall of the housing and embracing the passage, whereby the gate valve passage is tightly closed.

However, during skewing of the gate relative to the shaft which may occur during operation, particularly during opening of the gate valve passage, loads are non-uniformly distributed and tend to concentrate on one side of the articulating joint between the gate and the shaft, which may damage the gate valve.

There is also known a gate valve having a housing with a passage for admitting a fluid carying solids thereto and discharging it therefrom (cf., the AZ-1915-T type gate valve with a one-side sealing of the "Rheinhuttee" Company as described in the publication by N. F. Donner "Industrial Pipeline Fittings at the CHEMISTRY-82 Exhibition", Express- Information, series XM-10, TSINTIKHimneftemash, No. 1, 1983, p. 20, FIG. 6).

The housing of this prior art gate valve accommodates a seat made integral with the housing to embrace the passage.

The passage of the housing is closed by the gate when its contact surface area engages with the seat.

Through an articulating joint the gate is connected to a drive shaft acting to reciprocate the gate for closing and opening the passage in the housing. The articulating joint is made up of two elements the first of which is secured at the end of the shaft, whereas the second is affixed to the gate. The elements are so disposed that a clearance is provided therebetween.

Part of the shaft extends away from the housing for kinematical connection to the drive. The other part of the shaft is accommodated in the interior of the housing for connection by its end portion to the gate through a head member, which is actually the first element of the articulating joint. The head has the form of a cylindrical rod fixedly secured by means of a threaded connection on the rod end.

A stuffing box seal is provided at the point where the shaft projects from the housing.

The gate valve has a wall with a contact surface intended for cooperation with the seat to close the housing passage.

On the side opposite to the seat the gate has a rear wall serving for rigidly securing thereto of the second element of the articulating joint with the shaft.

The second element of the articulating joint is fashioned as a shell disposed in proximity to the upper end face of the gate facing the shaft.

The central portion of the shell accommodates a cylindrical blind hole the axis of which runs in line with the housing passage, the bottom thereof facing the gate.

This cylindrical hole serves to receive the shaft head.

A through slot is provided in the shell on the side of the upper end face of the gate facing the shaft to extend to the cylindrical hole and serve for receiving the shaft end therein.

The cylindrical hole of the shell accommodates the shaft head arranged with clearances between its cylindrical wall and bottom.

The articulating joint of the gate with the shaft is formed by the shell rigidly secured to the rear wall of the gate and the shaft head disposed therein.

Thanks to the clearances therebetween as well as between the shaft head end and the bottom of the cylindrical hole of the shell, the gate is movably connected to the shaft to be capable of movements transversely of the shaft axis at a distance corresponding to the total value of the clearance.

This ensures tight pressing of the contact surface of the gate to the seat during closing of the housing passage.

However, when a fluid medium carrying solid particles is conveyed through the gate valve, these clearances tend to be very quickly clogged with such solids, whereby the articulating joint is rendered immobile and fails to assure reliable tight fit between the gate contact surface and the seat.

In turn, this results in insufficient closing of the housing passage, whereby leaks appear between the contact surface of the gate and the seat.

These leaks spend some of the fluid, whereas solid particles carried with the fluid tend to erode the contact surfaces of the gate and seat to result in shorter service life and reduced reliability of the gate valve.

SUMMARY OF THE INVENTION

It is a major object of the present invention to provide a gate valve in which the articulating joint between the gate and drive shaft would be so constructed as to ensure tight closing of the housing passage by the gate.

Another object is to provide a gate valve of reliable construction.

One more object is to provide a gate valve of longer service life.

These objects are attained by that in a gate valve comprising a housing having a passage for admitting a liquid medium carrying solid particles thereto and discharing it therefrom closable by a gate connected to a drive shaft imparting a reciprocating motion thereto for opening and closing this passage through an articulating joint formed by two elements of which the first element is rigidly connected to the drive shaft and disposed with a clearance relative to the gate, whereas the second element is rigidly connected to the gate and arranged with a clearance relative to the first element, according to the invention, at least one of the two elements has a plurality of slots communicating these clearances with the passage on the side of the escape from the housing of the fluid medium for evacuating solid particles from the clearances.

The provision of the plurality of slots in one of the elements of the articulating joint ensures that during cooperation of the elements of the articulating joint solid particles accumulated in the clearances are evacuated therefrom to the slots. These solid particles are then conveyed through the slots to the housing passage.

This arrangement ensures that the solid particles fail to prevent the movement of the gate transversely of the shaft axis within the total amount of clearance.

Therefore, such an arrangement provides that the gate is tightly fitted to the seat during closing of the housing passage.

In turn, the tendency of the fluid medium to leak in the points of contact between the gate and seat is reduced to result in less pronounced wear due to the abrasive action of solid particles carried by the fluid medium.

Consequently, reduced wear of the gate and seat extends their service life and renders the gate valve more reliable in operation.

Preferably, the first of the two elements is fashioned as a head arranged at the end of the drive shaft, the second element having the form of a shell which adjoins by its end face the gate and embraces the head, the plurality of slots being preferably provided in the shell to form two rows of which the slots of the first row face by their inner open sides the inner surface of the shell and start at distance from the end face of the shell adjacent the gate to open on the its opposite free end, whereas the slots of the second row are preferably arranged between the slots of the first row to extend from the inner surface of the shell to its outer surface and face by their open sides the end face of the shell adjacent the gate.

Such an arrangement of the elements of the articulating joint and positioning of the slots in two rows promotes complete evacuation of solids carried by the fluid medium from the clearances of the articulating joint, since these solids are evacuated toward the two ends of the joint. This facilitates tighter fitting of the gate to the seat when the gate valve serves a fluid medium carrying solid particles.

The arrangement of the slots at a distance from the corresponding end faces of the shell promotes a more uniform distribution of forces during cooperation of the elements of the articulating joint, especially at portions adjacent their end faces.

This extends the service life of the articulating joint.

Advisably, the walls of each of the plurality of slots are arranged at an angle relative to the inner surface of the shell, this angle preferably ranging from a value equal to the angle of friction of the solid particles on the walls of the slot to 90°.

The arrangement of the slot walls at an angle to the inner surface of the shell within the abovementioned range provides conditions ensuring that the force of friction of the solids against the slot walls is less than the force tending to move the solids from the clearances when these solids are acted upon by the shaft head.

In consequence, this ensures a free passage of solid particles along the slots and their evacuation from the clearances of the articulating joint to result in added reliability of intimate contact between the gate and the seat.

With the inclination angle of the slot walls to the inner surface of the shell less than the angle of friction of solids on the slot walls, the friction force would overcome the force tending to expel the solids from the clearances under the action of the shaft head. Therefore, the solids would not be capable of movement along the slots and would remain in the clearances of the articulating joint.

Conversely, at an inclination angle in excess of 90° the slot walls would tend to narrow the slots toward the clearances of the articulating joint, which again would prevent evacuation of solids to the housing passage of the gate valve.

In view of the foregoing, the gate valve embodying the present invention ensures complete and reliable closing of the passage by the gate.

Another advantage of the proposed gate valve includes extended operation life.

BRIEF DESCRIPTION OF THE DRAWINGS

The invention will be described now in greater detail with reference to preferred embodiments thereof taken in conjunction with the accompanying drawings, in which:

FIG. 2 is an enlarged view of the gate valve taken along the arrow A in FIG. 1;

FIG. 3 is a section taken along the line III—III in FIG. 2;

FIG. 4 is a section along the line IV—IV in FIG. 2; and

DETAILED DESCRIPTION OF THE INVENTION

Figure 1:
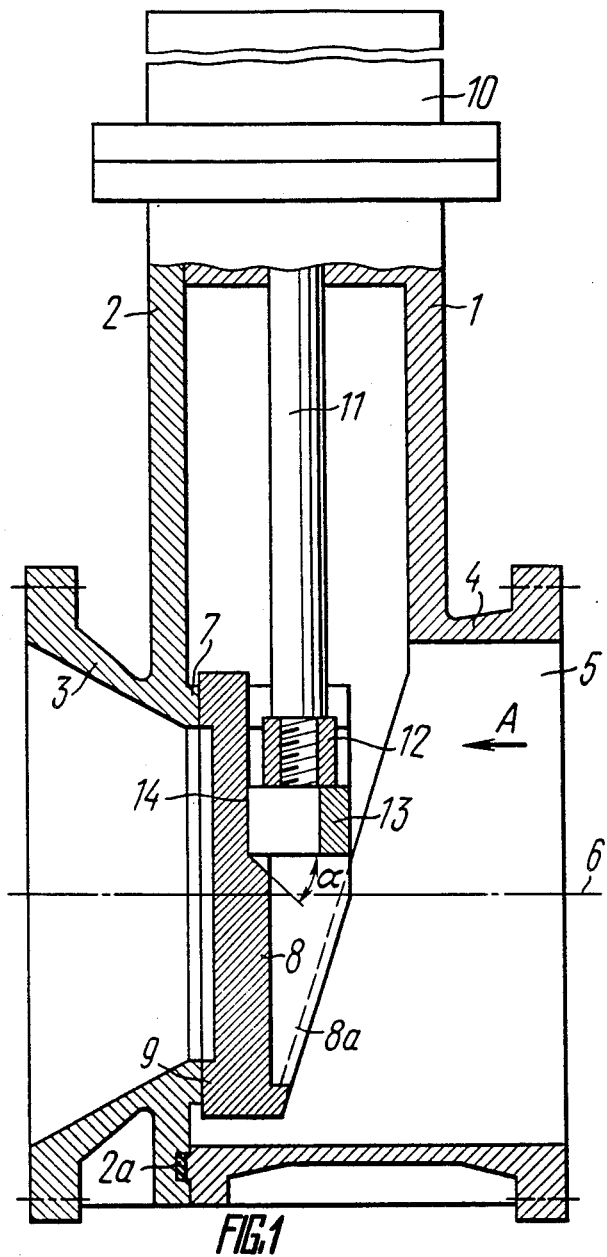
FIG. 1 is a longitudinal sectional view of a gate valve according to the present invention.

A gate valve according to the present invention comprises a housing 1 (FIG. 1) of box-like shape elongated vertically.

The housing 1 has a cover plate 2 provided with a flanged tube 3 for admitting a fluid medium carrying solid particles, the inner walls of this tube 3 tapering toward the housing 1. The housing 1 also has a tube 4 with inner substantially cylindrical surface for discharging the fluid medium. The cover plate 2 is sealed by a seal 2a relative to the housing 1. The tubes 3, 4 and the interior of the housing 1 define a passage 5 with a longitudinal axis 6. Provided on the cover plate 2 on the inside about the periphery of the tube 3 is an annular seat 7.

For opening and closing the passage 5 there is provided a gate 8 closly fitting to the seat 7 during closing of the passage 5.

The gate 8 has the form of a rectangular plate with a rounded lower edge.

The surface of the gate 8 facing the seat 7 has an annular projection 9 for cooperation with the seat 7. Stiffening ribs 8a are provided on the surface opposite to the surface of the gate 8 facing the seat 7.

A drive 10 is further provided disposed on the top portion of the housing 1 outside this housing 1 to be connected thereto by flanges (not indicated by reference numerals).

The drive 10 is generally an electric motor of any known suitable construction. It has a shaft 11 connected to the gate 8 to execute reciprocations for opening and closing the passage 5.

The shaft 11 extends through an upper wall (not indicated by a reference numeral) of the housing 1 toward the interior of the housing 1 perpendicularly in the axis 6.

The shaft 11 is connected to the gate 8 by way of an articulated joint formed by two elements 12 and 13 of which the first element 12 is generally a head member indicated by the same numeral 12.

The head 12 occupies the end of the shaft 11 and is rigidly connected to the shaft 11.

The second element 13 is a shell indicated by the same reference numeral 13 embracing the head 12 and rigidly connected by its end with the upper (as seen in FIG. 1) portion of the surface of the gate 8 opposite to its surface facing the seat 7.

The shell 13 is connected to the gate 8 by means of screws 13a (as seen best in FIG. 2). Alternatively, such a connection can be done with success otherwise, such as by welding. In order to accommodate the shell 13, the gate 8 has a thinned portion in its upper section (not indicated by a reference numeral in FIG. 1).

The shell 13 has a free end 15 (FIG. 2) in opposition to the end 14.

A clearance 16 is present between the elements 12 and 13, particularly between the head 12 and the inner cylindrical surface 18 of the shell 13, an outer cylindrical surface 19 of the shell being also cylindrical.

The shell 13 has a plurality of slots 20 and 21 communicating the clearances 16, 17 with the passage 5 (FIG. 1) on the side of the escape of the fluid medium from the housing 1 to evacuate solid particles from these clearances 16 and 17 (FIG. 2).

The plurality of slots 20 and 21 form two rows (as seen in FIG. 2), the slots 20 making up the first row, whereas the slots 21 form the second row.

The slots 20 of the first row (FIG. 3) face by their open side the inner surface 18 of the shell 13 (FIG. 2), begin at a distance from the end 14 (FIG. 3) of the shell 13 adjacent the gate 8 and open on the opposite free end 15.

Such an arrangement of the slots 20 makes it possible to evacuate solids from the clearance 16 toward the free end 15 of the shell 13 opening on the passage 5 of the housing 1.

The slots 21 of the second row (as seen best in FIG. 2) are disposed between the slots 20 of the first row, extend (as seen in FIG. 4) from the inner surface 18 of the shell 13 to its outer surface 19 and face by their open side the end 14 of the shell 13 adjoining the gate 8.

This arrangement of the slots 21 ensures evacuation of solids from the clearances 16 and 17 toward a portion of the outer surface 19 disposed in proximity to the end 14 of the shell 13 adjacent the gate 8. The slots 21 open toward the passage 5 of the housing 1, which facilitates the evacuation of solids from the clearances 16 and 17.

The thinned or narrowed portion (not indicated by reference numerals in FIG. 1) of the gate 8 forms a shoulder (not indicated by a reference numeral) at the point of its connection to the rest of the surface of the gate 8 opposite to the surface facing the seat 7. The shoulder is inclined an angle α to the outer surface 19 of the shell 13, in this case this angle being equal to 30°.

Thanks to the aforedescribed arrangement, solid particles are not retained at the outlet from the slots 21, but freely move along the abovesaid shoulder to ensure their unimpeded evacuation from the grooves 21.

Because the slots 20 and 21 begin at some distance from the ends 14 and 15 of the shell 13, as seen best in FIGS. 3 and 4, there are portions (not indicated by reference numerals) between these ends and the beginning of each said slot 20, 21 on the inner surface 18 thanks to which damage of the inner surface 18 is considerably reduced during an increase in pressure due to skewing of the head 12 relative to the inner surface 18 of the shell 13 within the amount of clearance 16 which may take place in the course of operation of the gate valve.

As represented in FIG. 2, the slots 20 and 21 occupy positions along axes (not indicated by reference numerals) substantially perpendicular to the inner surface 18 of the shell 13, which also facilitates evacuation of solids from the clearances 16 and 17 when the head 12 of the shaft 11 acts thereon.

As shown in FIGS. 3 and 4, the walls (not indicated by reference numerals) of each of the plurality of slots 20 and 21 are arranged also at an angle $\alpha$ to the inner surface 18 of the shell 13, the value of this angle ranging from the angle of friction of solids on the walls of the slot to 90°. In this case the angle is 30°, which corresponds to the angle of friction of solid particles on the walls of the slots 20 and 21 of the shell 13 fabricated from steel.

This arrangement of the slots 20 and 21 promotes unobtrusive passage of solid particles through these slots and their evacuation to the passage 5 of the housing 1.

Figure 5:
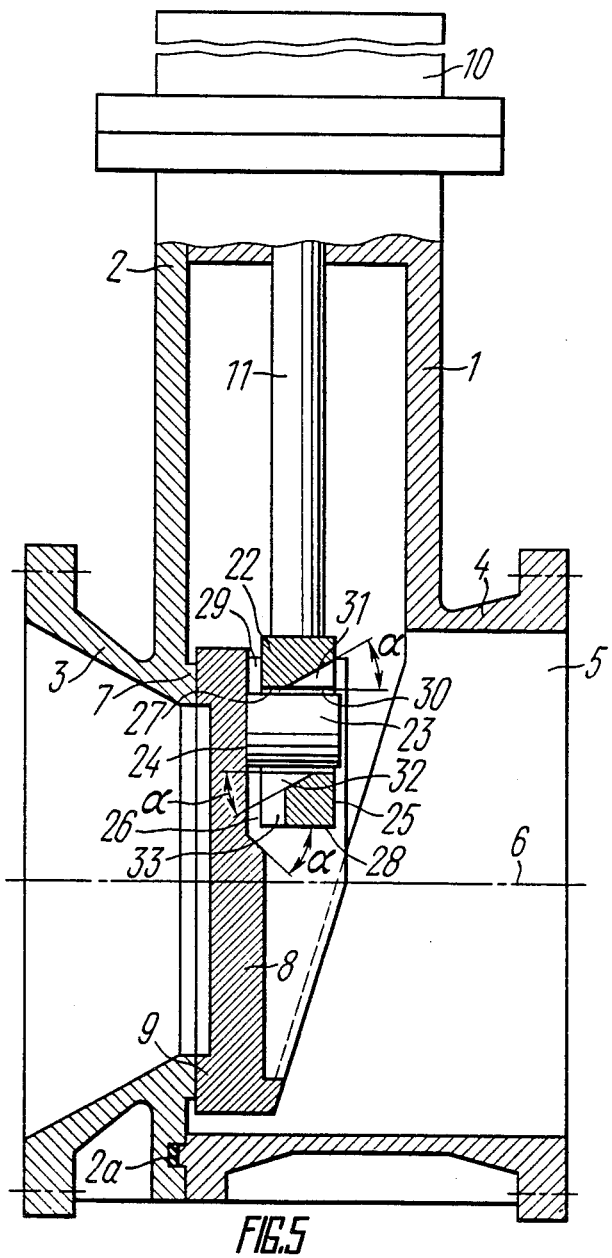
FIG. 5 is a schematic representation of the proposed gate valve with the first element in the form of a shell rigidly affixed to a shaft, the second element of the articulating joint having the form of a rod fixedly secured to the gate.

In an alternative embodiment of the proposed gate valve represented in FIG. 5 the housing 1, cover plate 2, seal 2a, tubes 3 and 4, passage 5 with the longitudinal axis 6, seat 7, gate 8 with the annular projection 9, drive 10 and shaft 11 are essentially identical to the gate valve illustrated in FIGS. 1 to 4 and indicated by the same reference numerals.

The articulated connection of the gate 8 to the shaft 11 is made up of two elements of which the first element 22 is generally a shell indicated by the same numeral 22, arranged on the end of the shaft 11 and rigidly secured on the shaft 11 by any known suitable means to embrace the second element 23 of the articulated connection in the form of a rod indicated by the same numeral 23, this rod 23 being connected to the gate 8 by its end 24.

The shell 22 has a free end 25 and an end 26 facing the gate 8, as well as a cylindrical inner surface 27 and an outer surface 28.

A clearance 29 is provided between the end 26 facing the gate 8 of the shell 22 and the gate 8, whereas between the inner surface 27 of the shell 22 and the rod 23 there is a clearance 30. These clearances 29 and 30 make it possible for the gate 8 to travel transversely of the shaft 11 so that the annular projection 9 of the gate 8 could be tightly pressed to the seat 7.

The shell 22 of the shaft 11 has a plurality of slots 31 and 32 communicating the clearances 29 and 30 with the passage 5 on the side of the outlet of the fluid medium from the housing 1 for evacuating solids from the gaps 29 and 30.

The plurality of slots 31 and 32 form two rows, the slots 31 making up the first row, whereas the slots 32 form the second row.

The slots 31 and 32 face by their open side the inner surface 27 of the shell 22.

The slots 31 of the first row begin at a distance from the end 26 of the shell 22 facing the gate 8 to open on its opposite free end 25.

The slots 32 of the second row are disposed between the slots 31 of the first row, extend from the inner surface 27 of the shell 22 toward its outer surface 29 and face by the open side the end 28 arranged with the clearance 29 relative to the gate 8.

The walls of each of the slots 31 of the first row are also arranged relative to the inner surface 27 of the shell 22 at an angle $\alpha$ of 30°, which corresponds to the angle of friction of the solid particles of coal on the walls of the shell 22 fabricated from steel. With the presence of solid particles in the flowing medium passing through the gate valve the angle $\alpha$ ranges from a value equal to the angle of friction of the solid particle on the wall of the slot to 90°.

The walls of each of the slots 32 of the second row are arranged relative to the inner surface 27 of the shell 22 at the same angle $\alpha$ as the walls of the slots 31 except a portion 33 of the slot 32 which is in proximity to the end 26 of the shell 22 facing the gate 8. The walls of the portion 33 of the slot 32 are perpendicular to said inner surface 27 of the shell 22 to facilitate the flow of solids carried by the fluid medium through the slots 32 to the passage 5 of the housing 1.

The aforedescribed connection of the gate to the shaft is applicable for other types of pipe fittings, such as valves, cocks, non-return valves and the like; the plurality of slots 20 can be provided either in the first or in the second element of the articulating joint.

The gate valve embodying the present invention and illustrated in FIGS. 1 to 4 operates in the following manner.

Upon actuation of the drive 10 the shaft 11 moves from its initial position (not shown in FIG. 1) downwards inside the housing 1 to exert action on the shell 13 through the head 12 rigidly affixed on the end of the shaft 11.

In turn, the shell 13 rigidly secured on the gate 8 moves the gate 8 downwards under the action of the shaft 11. Therewith, the annular projection 9 of the gate 8 cooperates with the seat 7 for the gate 8 to close the passage 5 of the housing 1 thereby terminating the flow of liquid medium through the gate valve.

By virtue of the clearance 17 between the head 12 and gate 8, as well as thanks to the clearance 16 between the head 12 and the inner surface 18 of the shell 13, the gate 8 can move transversely of the shaft 11. This ensures that the gate 8 is pressed tightly by its annular projection 9 to the seat 7.

When solid particles carried by the fluid medium enter the clearances 17 and 16, they are forced by the head 12 through the slots 20 and 21 of the shell 13 to the passage 5 of the housing 1 to ensure that the gate 8 is tightly pressed to the seat 7 even in the presence of solid particles in the fluid medium.

Easy evacuation of solids from the clearances 16 and 17 is further promoted by the arrangement of their walls at an angle $\alpha$.

In the case of skewing of the gate 8 relative to the shaft 11 within the space of the clearances 16 and 17 subsequent to it being pressed against the seat 7, which is possible when the gate 8 is worn out by solids present in the fluid medium, the head 12 cooperates with the shell 13 by virtue of the provision of portions of the inner surface 18 of the shell 13 between the ends 14 and 15 of the shell 13 and the start of its slots 20, 21.

Pilot models of the gate valve embodying the present invention have passed tests to satisfaction, the results of tests evidencing reliable operation when used in coal mill pipelines through which a pulp-like fluid containing coal and rock particles was pumped.

The proposed gate valve is simple in construction, easy to operated and has a longer service life thanks to that the gate invariably fits tightly to the seat.

Optimized positioning of slots in the elements of the articulating joint between the gate and shaft makes these elements last longer, while retaining the overall dimensions and weight of the gate valve comparable with gate valves not intended for operation with fluids carrying solids.

What we claim is:

1. A gate valve comprising
   a housing;
   a passage in said housing defined by its walls for admitting a fluid medium carrying solid particles to and discharging from the housing;
   gate means for closing said passage;
   a shaft pivotably connected to said gate means; means for moving said shaft; articulating joint means;
   said gate means connected to said shaft for reciprocating motions through said articulating joint means;
   at least two elements forming said articulating joint means and arranged with a clearance therebetween; a first of said two elements rigidly connected to said shaft and arranged with a clearance relative to said gate means; a second of said two elements is rigidly connected to said gate means;
   a plurality of slots provided in at least one of said two elements for communicating the clearance between said two elements and the clearance between the first of said two elements and said gate with said passage on the side of the escape of the fluid medium from said housing for evacuating solid particles from these clearances.

2. A gate valve comprising
   a housing;
   a passage in said housing defined by its walls for admitting a fluid medium carrying solid particles to and discharging from the housing;
   gate means for closing said passage;
   a shaft pivotably connected to said gate means; means for moving said shaft; articulating joint means;
   said gate means connected through said articulating joint means to said shaft for reciprocating motion;
   at least two elements forming said articulating joint means, said two elements arranged with a clearance therebetween; a first of said two elements rigidly connected to said shaft and arranged with a clearance relative to said gate means; a second of said two elements rigidly connected to said gate means;
   a plurality of slots provided within at least one of said two elements for communicating the clearance between said two elements and the clearance between the first of said two elements and said gate means with said passage on the side of the escape of the fluid medium from said housing for evacuating solid particles from said clearances;
   the first element is arranged at an end of said shaft; the second element having a shell shaped configuration adjoining by its end face said gate and embracing the first element;
   said plurality of slots provided within the second element having the shell shaped configuration and defining at least two rows, slots of a first row facing by open sides thereof an inner surface of the shell and starting at a distance from the end face of the shell adjacent said gate means, the slots of the first row open up at a free end thereof; slots of a second row arranged between the slots of the first row to extend from the inner surface of the shell to an outer surface of the shell and side portions of the slots of the second row face the end face of the shell adjacent said gate means.

3. A gate valve as defined in claim 2, in which the walls of each of said plurality of slots are arranged at an angle to the inner surface of the shell, this angle ranging from a value equal to the angle of friction of the solid particles on the walls of the slot to 90°.

* * * * *